April 20, 1926.
N. H. SCHMUCK
MOUSETRAP
Filed Jan. 12, 1925
1,581,297
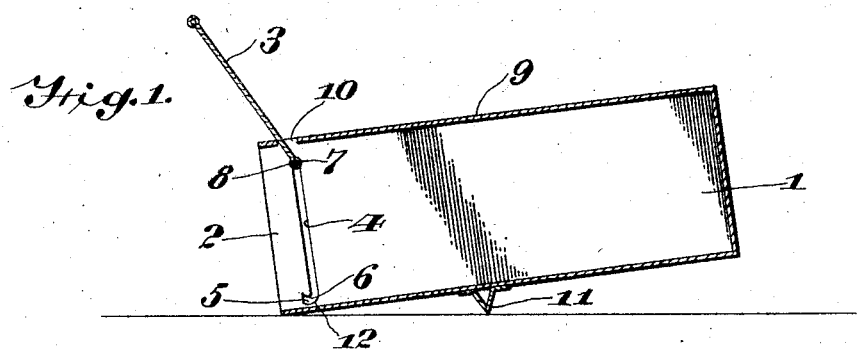
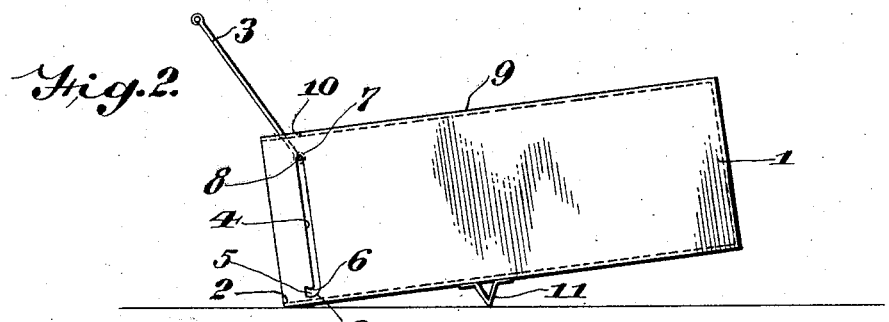
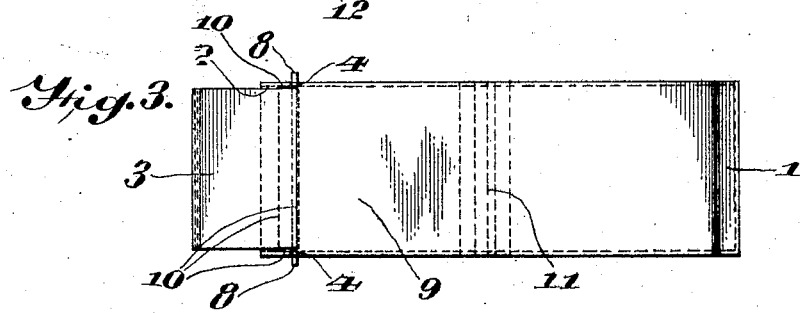
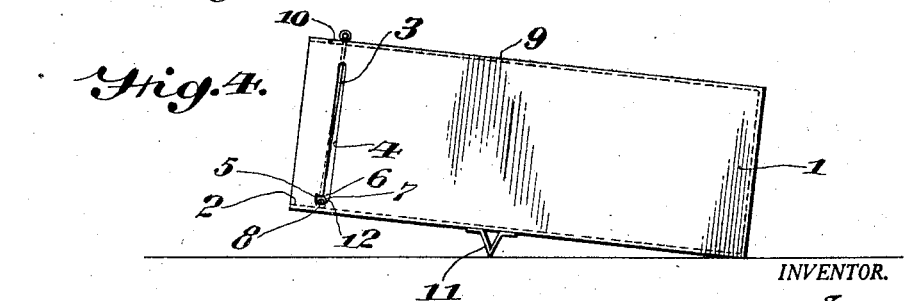
INVENTOR.
Nicolai Heinrich Schmuck
BY
Cyrus N. Anderson
ATTORNEY.

Patented Apr. 20, 1926.

1,581,297

UNITED STATES PATENT OFFICE.

NICOLAI HEINRICH SCHMUCK, OF HAMBURG, GERMANY.

MOUSETRAP.

Application filed January 12, 1925. Serial No. 1,734.

*To all whom it may concern:*

Be it known that I, NICOLAI HEINRICH SCHMUCK, a citizen of Germany, and a resident of the city of Hamburg, Germany, have invented an Improvement in Mousetraps, of which the following is a specification.

My invention relates to mouse traps, and it has for a general object to provide a construction of trap which not only is simple but in which there is certainty of operation when a mouse or rat has entered the same and approaches the bait placed therein.

It is also an object of the invention to provide a trap having means whereby it is rendered tiltable and also having means whereby, upon tilting the same in one direction, the closure for an open end thereof is caused to move into closed position.

Another object of the invention is to provide a trap having a closure which is adapted to be moved from open into closed position when the said trap is tilted from one position into another position by the approach of a mouse, rat or the like to bait which may be placed in the rear end portion of the trap.

To these and other ends my invention comprehends the construction and arrangement of parts as hereinafter described in detail, illustrated in the drawing and as particularly pointed out in the claims.

In order that the invention may be more readily understood reference should be had to the accompanying drawing in which I have illustrated one form of a convenient embodiment of the invention. However, it will be understood that changes in the details of construction may be made within the scope of the claims without departing from the principle thereof.

In the drawing:

Fig. 1 is a view in vertical longitudinal section of a trap embodying the invention, the trap being in set position and the closure thereof being shown in open position;

Fig. 2 is a view in side elevation;

Fig. 3 is a top plan view; and

Fig. 4 is a view in side elevation of the trap showing the same after it has been tilted from the position shown in Figs. 1, 2 and 3 and with the closure in closed position.

Referring to the drawing: 1 designates a box-like structure of any suitable material, as for instance sheet metal. This structure is closed except at one end, as indicated at 2. This end, however, is adapted to be opened and closed by the door or closure 3. The opposite sides of the box-like structure 1 adjacent the open end thereof are provided with slots 4. The lower ends are of hook-shape as indicated at 5. The presence of these hooks provides shoulders as indicated at 6. The lower end of the door terminates in a bent portion 7 whereby an opening is provided through which a small rod 8 extends. The opposite ends of this rod project through the slots 4 in the opposite sides of the box structure 1. The top 9 of the structure 1 is provided with a rectangular-shaped slot 10 of a width considerably greater than the thickness of the closure 3. This slot is located near the front or open end of the structure and is situated above and in part forwardly of the plane of the slots 4. The closure 3 extends upwardly through the said slot. As already indicated, the forward edge of the rectangular slot 10 is located in advance of the plane through the slots 4. In consequence of this relationship when the closure 3 is lifted to its uppermost and open position, as shown in Figs. 1, 2 and 3, it tilts forward and rests against the forward edge of the said slot 10. The box-like structure 1 is provided upon its bottom, at a point nearer to the forward open end thereof than to the rear end thereof, with a V-shaped fulcrum support 11 which extends transversely of the bottom underneath the same, as indicated. The lower sharp edge of the said fulcrum support constitutes the pivotal line of the said box-like structure.

When the closure is in open position and tilted forward as indicated in Figs. 1, 2 and 3, the weight thereof together with the weight of the portion of the box-like structure to the left of the fulcrum support 11 (having reference to the figures of the drawing) is sufficient to overbalance the weight of the opposite end portion of the structure together with the weight of any bait which may be placed therein, and hold the same in the position shown in Fig. 1.

In case a mouse, rat or other small living thing which it may be desired to catch should enter the said structure 1 through the open end thereof and pass beyond the fulcrum support 11 the rear closed end of the said structure would be depressed, thereby causing an elevation of the front end portion thereof. Upon such elevation or upward movement of the front end portion of the said structure the door or closure 3 automatically descends into the closed position indicated in Fig. 4 of the drawing. As the opposite projecting ends of the rod 8 strike the outer curved edge portion 12 at the lower ends of the slots 4 the said ends are cammed forwardly into positions underneath the shoulders 6. When in such position it is impossible for a mouse, rat or the like to accidentally open the closure and thereby effect an escape. In other words, in order to effect opening of the closure it is necessary first to shift the lower end thereof toward the right (having reference to the figures of the drawing) to remove the opposite ends of the rod 8 from underneath the shoulder 5, after which the door or closure 3 may be returned to open position as shown in Figs. 1, 2 and 3.

Instead of a rod 8 any other suitable means may be employed for providing lateral oppositely extending projections from the lower edge of the door or closure 3 for extending into the slots 4.

It will be observed that the door or closure 3 is of a height such that when it is in closed position the upper end portion thereof projects through the rectangular slot 10, as indicated in Fig. 4 of the drawing.

It will be seen that by my invention I have provided a construction of trap which is simple and efficient and in which there is no mechanism which is liable to get out of order and thereby render the device inoperative or ineffective.

Having thus described my invention, what I claim and desire to secure by Letters Patent is:

1. A mouse trap comprising a box-like structure open at one end, the opposite sides of which are provided near the open end thereof with transversely extending slots, the lower ends of said slots terminating adjacent the lower edges of said sides and the upper ends thereof terminating near the upper edges of said sides, and the top of said structure being provided with a rectangular opening near the front end thereof and in part forwardly of the plane of the said slots, a door having slidable connection at its lower end with the slots in the sides of the said structure, which door extends upwardly through the said rectangular opening, and a fulcrum support secured to the under side of the bottom of the said box-like structure at a point intermediate the ends thereof, the weight of the portion of the said box-like structure between the said fulcrum support and the open end thereof and the said door when the latter is in open position operating to hold the said box-like structure with its open end in depressed position, and the said door being adapted to move automatically into closed position upon a depression of the rear closed end of the said box-like structure.

2. A mouse trap comprising a box-like structure open at one end, the opposite sides of which are provided near the open end thereof with transversely extending slots, the lower ends of said slots terminating in forwardly extending hook-shaped portions adjacent the lower edges of said sides and the upper ends thereof terminating near the upper edges of said sides, and the top of said structure being provided with a rectangular opening near the front end thereof and in part forwardly of the plane of the said slots, a door having slidable connection at its lower end with the slots in the sides of the said structure, which door extends upwardly through the said rectangular opening, and a fulcrum support secured to the underside of the bottom of the said box-like structure at a point intermediate the ends thereof, the weight of the portion of the said box-like structure between the said fulcrum support and the open end thereof and the said door when the latter is in open position operating to hold the said box-like structure with its open end in depressed position, and the said door being adapted to move automatically into closed position and to be retained in such position by said forwardly extending hook-shaped portions of said slots upon a depression of the rear closed end of the said box-like structure.

3. A mouse trap comprising a box-like structure open at one end, fulcrum supporting means upon the lower side of said structure, the said fulcrum support being located at a point intermediate the opposite ends thereof, the opposite sides of said box-like structure being provided with transversely extending slots, the lower ends of said slots terminating in forwardly extending hook-like portions, the top of said structure being provided with a rectangular opening near the front end thereof and partly in advance of the plane of said slots, a door having projections extending into said slots and adapted to slide therein, which door extends upwardly and forwardly through said rectangular opening and is adapted to be retained in such position by friction when the forward open end of said box-like structure is in depressed position, the said door adapted to move automatically into closed position and to be retained in such position by said forwardly extending portions of said slots upon a depression of the rear closed end of the said box-like structure.

In testimony that I claim the foregoing as my invention, I have hereunto signed my name this 22nd day of December 1924.

NICOLAI HEINRICH SCHMUCK.